United States Patent [19]
Seo

[11] Patent No.: US 6,192,042 B1
[45] Date of Patent: Feb. 20, 2001

[54] DEVICE AND METHOD FOR MULTIUSER DETECTION IS DS-CDMA SYSTEM

[75] Inventor: Kyung Sam Seo, Seoul (KR)

[73] Assignee: LG Information & Communications, Ltd., Seoul (KR)

[*] Notice: Under 35 U.S.C. 154(b), the term of this patent shall be extended for 0 days.

[21] Appl. No.: 08/997,996

[22] Filed: Dec. 24, 1997

[30] Foreign Application Priority Data

Dec. 22, 1997 (KR) ................................................. 97-71797

[51] Int. Cl.[7] .................................................. H04B 7/216
[52] U.S. Cl. ........................................... 370/342; 375/152
[58] Field of Search .................................. 370/203, 320, 370/335, 342, 441, 479; 375/142, 143, 144, 148, 150, 152, 260, 343

[56] References Cited

U.S. PATENT DOCUMENTS

| | | | |
|---|---|---|---|
| 4,470,138 | * 9/1984 | Gutleber | 370/342 |
| 5,363,403 | * 11/1994 | Schilling et al. | 370/441 |
| 5,463,660 | * 10/1995 | Fukasawa et al. | 370/342 |
| 5,467,368 | * 11/1995 | Takeuchi et al. | 375/206 |
| 5,553,062 | * 9/1996 | Schilling et al. | 370/479 |
| 5,579,304 | * 11/1996 | Sugimoto et al. | 370/342 |
| 5,719,852 | * 2/1998 | Schilling et al. | 370/201 |
| 5,956,333 | * 9/1999 | Zhou et al. | 370/342 |
| 6,014,373 | * 1/2000 | Schilling et al. | 370/342 |

* cited by examiner

Primary Examiner—Chi H. Pham
Assistant Examiner—Kwang B. Yao
(74) Attorney, Agent, or Firm—Fleshner & Kim, LLP

[57] ABSTRACT

Device and method for decorrelated multiuser detection in a DS-CDMA system, is disclosed, which allows real time removal of an MAI(Multiple Access Interference) occurred in the DS-CDMA system, the method including the steps of(a) receiving signals band spread by multiuser spreading codes transmitted from multiuser respectively and despreading the received signals with conjugate complexes of the multiuser spreading codes, to restore each of multiuser messages y, (b) spreading each of the multiuser messages with the multiuser spreading codes, summing, despreading with the conjugate complexes of the multiuser spreading codes, low pass filtering, and subtracting from the multiuser messages y under bit synchronization, for extracting multiple access interference signals Qy according to cross-correlation coefficients between the multiuser spreading codes contained in each of the messages y; for the first time, and (c) adding negative values of the multiple access interference signals Qy extracted in the step (b) to the multiuser messages y under bit synchronization, for restoring each of multiuser messages $Z=(I-Q)y$ having the multiple access interference signals removed therefrom for the first time (where, Q denotes a matrix with its diagonal entries being 0 and the other entries being the cross-correlation coefficients between each of the multiuser spreading codes and I denotes an identity matrix with its diagonal entries being unity, $Z=[Z_1, ---, Z_K]$ and $y=[y_1, ---, y_K]$).

10 Claims, 5 Drawing Sheets

DEVICE AND METHOD FOR MULTIUSER DETECTION IS DS-CDMA SYSTEM

BACKGROUND OF THE INVENTION

1. Field of the Invention

The present invention is related to a device and method for a multiuser detection in a DS-CDMA(Direct Sequence-ode Division Multiple Access) system, and more particularly, to a device and method for a decorrelating multiuser detection in a DS-CDMA system which allows real time removal of an MAI(Multiple Access Interference) occurred in the DS-CDMA system.

2. Discussion of the Related Art

The DS-CDMA system is a system in which a transmitter modulates and transmits its message by making a direct band spreading with a pseudo noise (PN) code or a spreading signal(code) assigned to multiusers individually for distinguishing between the multiusers, and a receiver restores an originally transmitted message by receiving the transmitted signal and by despreading the transmitted signal with the spreading code. Since the DS-CDMA system has many merits, such as strong in multipath fading, good utilization of voice activity cycles, availability of soft handoff between base stations, strong in jamming, and reuse of one frequency band, which reuse allows the DS-CDMA system to have a greater capacity over background art systems, the DS-CDMA systems has been spot lighted in implementation of cellular and personal communications, recently. Despite the aforementioned merits of the DS-CDMA system, because its performance is restricted by MAI occurred at multiuser reception or great SNR(signal to noise ratio), ceaseless efforts have been concentrated on removing the MAI, and thus various multiuser detectors have been proposed up to now.

As a typical one of the multiuser detector, there is a decorrelating multiuser detector as shown in FIG. 1, provided with a matched filter block 10 having a plurality of multipliers ($CO_1$–$CO_K$), a plurality of integrators ($I_1$–$I_K$), and a plurality of switches ($SW_1$–$SW_K$) for despreading a received signal r(t) with multiuser' spreading codes to provide a sample of each message of the multiuser, a $R^{-1}$ filter 11 for filtering the samples in the matched filter block 10 to remove an MAI signal included in each of the samples of the multiuser's messages, and a binary data determining part 12 having a plurality of determiners($DC_1$–$DC_K$) for comparing plural outputs ($Z_1$–$Z_K$) corresponding to the multiuser of the $R^{-1}$ filter 11 with a threshold voltage to determine binary outputs ($b_1$–$b_K$).

The operation of the background art decorrelating multiuser detector will be described The received signal r(t) input to the decorrelating multiuser detector is despreaded through the plurality of matched filters in the matched filter block 10 having the plurality of multipliers ($CO_i CO_K$), integrators ($I_1$–$I_K$) and switches ($SW_1$–$SW_K$) and each of the original messages of the multiuser is recovered. The outputs ($y_1$–$y_K$) of the matched filter block 10 can be expressed as a matrix as follows.

$$y=RAb+n,$$

$$R = \begin{Vmatrix} 1 & P_{12} & P_{13} & \ldots & P_{1K} \\ P_{21} & 1 & P_{23} & \ldots & P_{2K} \\ \vdots & \vdots & \vdots & \vdots & \vdots \\ P_{K1} & P_{K2} & \ldots & \ldots & 1 \end{Vmatrix} \quad (1)$$

Where,
$$Y=(y_1, (y_2, \ldots, y_K)^T$$

$$A = \begin{Vmatrix} a_1 & 0 & \ldots & 0 \\ 0 & a_2 & \vdots & \vdots \\ \vdots & \vdots & \ddots & \vdots \\ 0 & \ldots & 0 & a_K \end{Vmatrix}$$

$$b=(b_1, b_2, \ldots, b_K)^T$$
$$n=(n_1, n_2, \ldots, n_K)^T$$

Where, $a_i$ is a received amplitude of an with multiuser, A is an amplitude matrix of the received signal, b is a bit vector of a transmitted data, n is a Gaussian noise vector, and an element $P_{ij}$, in the R matrix represents a cross-correlation coefficient between with and jth user spreading codes.

If an output y from the matched filter block 10 as expressed in equation (1), is provided to the $R^{-1}$ filter 11, an output Z expressed as the following equation (2) can be obtained.

$$Z=R^{-1}y=Ab+R^{-1} \quad (2)$$
$$Z=(Z_1, Z_2, \ldots Z_K)$$

The output Z of the $R^{-1}$ filter 11, expressed as equation (2), sends to the binary data determining part 12 having the binary determiners $DC_1$–$DC_K$ where the binary data of multiuser is recovered.

The background art decorrelating multiuser detector can completely remove the MAI signal caused by the cross-correlation value (not 0) between multiuser's spreading codes and included in the output y of the matched filter 10 by using the $R^{-1}$ filter and thus can improve quality of the received signal. However, the $R^{-1}$ filter is required to compute an inverted matrix of R as shown in the following equation (3). This computation becomes the more complex as the dimension of the matrix becomes the greater as a number of the users increases.

$$R^{-1} = \frac{1}{\det(R)} \begin{Vmatrix} b_{11} & b_{12} & \ldots & b_{1K} \\ b_{21} & b_{22} & \ldots & b_{2K} \\ b_{K1} & b_{K2} & \ldots & b_{KK} \end{Vmatrix} \quad (3)$$

In this equation (3), the diagonal element $b_{11}$ is expressed as $b_{11}=1-(K-1)(K-2)/2$ second order term of the cross-correlation coefficient $+O(P^3)$, the diagonal element $b_{22}$ is expressed as $b_{11}=1-(K-1)(K-2)/2$ second order term of the cross-correlation coefficients $+O(P^3)$, and the other diagonal elements $b_{ij}$ are expressed in the same manner. The non-diagonal element $b_{12}$ is expressed as $b_{12}=-P_{12}+(K-2)$ second order term of the cross-correlation coefficients $+O(P^3)$ and the non-diagonal element $b_{13}$ is expressed as $b_{13}=-P_{13}+(K-2)$ second order term of the cross-correlation coefficients $+O(P^3)$. The other non-diagonal element $b_{ij}$ is expressed in the same manner. The $O(P^3)$ denotes a polynomial of the cross-correlation coefficients having a third order term and greater. Therefore, the $R^{-1}$ filter has a problem in that a circuit can not be realized actually due to the excessive amount of computation.

In order to solve the aforementioned problem, Moshavi et al. disclosed a paper titled "Multistage Linear Receiver for DS-CDMA Systems" (International journal of wireless Information Network, vol. 3, No. 1, 1996). Referring to FIG. 2, the decorrelating multiuser detector disclosed by the paper is provided with a match filter block G for multiplying a received signal r(t) transmitted from multiuser with a conjugate complex $g_0^*(t) \sim g_{K-1}^*(t)$ of the spreading code and passing through a low pass filter(LPF) for despreading the received signal r(t), a least mean square error detecting part having a multistage R, R,—of cross-correlation coefficient matrix implementing blocks R for multiplying, and summing the spreading code $g_0(t) \sim g_{K-1}(t)$ from transmitters to outputs $y_0 \sim y_{K-1}$ of the matched filter block G, multiplying to the conjugate complex $g_0^*(t) \sim g_{K-1}^*(t)$ of the spreading code from the transmitters, and passing through low pass filters(LPF), wherein the outputs $y_0 \sim y_{K-1}$ of the matched filter block G are multiplied to weighted values $W_0$, $W_1$, $W_2$,—which are coefficients calculated on least mean square error basis of outputs of each stage, compensated for a time delay at each stage through a delay Tb which delays for one bit, and added of a signal from the multistage of the cross-correlation coefficient matrix implementing blocks R, R,—in the least mean square error detecting part, to obtain an approximate output d̂ of the background art decorrelating detector The aforementioned example shows the least mean square error detecting part having two stages of the cross-correlation coefficient matrix implementing blocks for simplicity. According to the aforementioned system, because values of Ry, $R^2y$,—are generated every time one stage of the cross-correlation coefficient matrix implementing block R in the least mean square error detecting part is passed, which are then multiplied of the weighted values $W_0$, $W_1$, $W_2$,—and time compensated, to obtain d̂, an approximate inverted matrix R of the cross-correlation coefficient matrix R can be implemented.

However, because the background art should calculates the weighted values $W_0$, $W_1$, $W_2$,—on a least mean square error basis again under an ambient in which the cross-correlation coefficient matrix changes quickly according to time, such as a system which uses a long code, or of an asynchronous type, or a number of the multiuser changes quickly, the background art has problems as that not only an additional block is required for calculating the above, but also a real time implementation of the same in actual system is difficult.

SUMMARY OF THE INVENTION

Accordingly, the present invention is directed to device and method for a multiuser detection in a DS-CDMA system that substantially obviates one or more of the problems due to limitations and disadvantages of the related art.

An object of the present invention is to provide device and method for a multiuser detection in a DS-CDMA system, which, not only has a simple implementing circuit but also carried out in real time.

Other object of the present invention is to provide device and method for a multiuser detection in a DS-CDMA system, which can reduce multiple access interference effect, allowing an increase of user capacity and reduction in a bit error rate(BER).

Additional features and advantages of the invention will be set forth in the description which follows, and in part will be apparent from the description, or may be learned by practice of the invention The objectives and other advantages of the invention will be realized and attained by the structure particularly pointed out in the written description and claims hereof as well as the appended drawings.

To achieve these and other advantages and in accordance with the purpose of the present invention as embodied and broadly described, the method for multiuser detection in a DS-CDMA system includes the steps of (a) receiving signals band spread by multiuser spreading codes transmitted from multiuser respectively and despreading the received signals with conjugate complexes of the multiuser spreading codes, to restore each of multiuser messages y, (b) spreading each of the multiuser messages with the multiuser spreading codes, summing, despreading with the conjugate complexes of the multiuser spreading codes, low pass filtering, and subtracting from the multiuser messages y under bit synchronization, for extracting multiple access interference signals Qy according to cross-correlation coefficients between the multiuser spreading codes contained in each of the messages y, for the first time, and (c) adding negative values of the multiple access interference signals Qy extracted in the step (b) to the multiuser messages y under bit synchronization, for restoring each of multiuser messages Z=(I−Q)y having the multiple access interference signals removed therefrom for the first time (where, Q denotes a matrix with its diagonal entries being 0 and the other entries being the cross-correlation coefficients between each of the multiuser spreading codes and I denotes an identity matrix with its diagonal entries being unity, Z=[$Z_1$, - - -, $Z_K$] and y=[$y_1$, - - -, $y_K$]).

In other aspect of the present invention, there is provided a device for a multiuser detection in a DS-CDMA system including a matched filter block for despreading signals received from multiuser with multiuser spreading codes to restore messages of the multiuser, a multiple access interference signal extracting part having approximate decorrelation detectors connected in series at terminals thereon for spreading, despreading, filtering outputs from the matched filter block by using the spreading codes for extracting multiple access interference signals according to cross correlation coefficients between the multiuser spreading codes, and a multiple access interference signal removing part for adding/subtracting outputs at each stage of the multiple access interference signal extracting part to/from outputs from the matched filter block, for removing the multiple access interference signals.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 3:
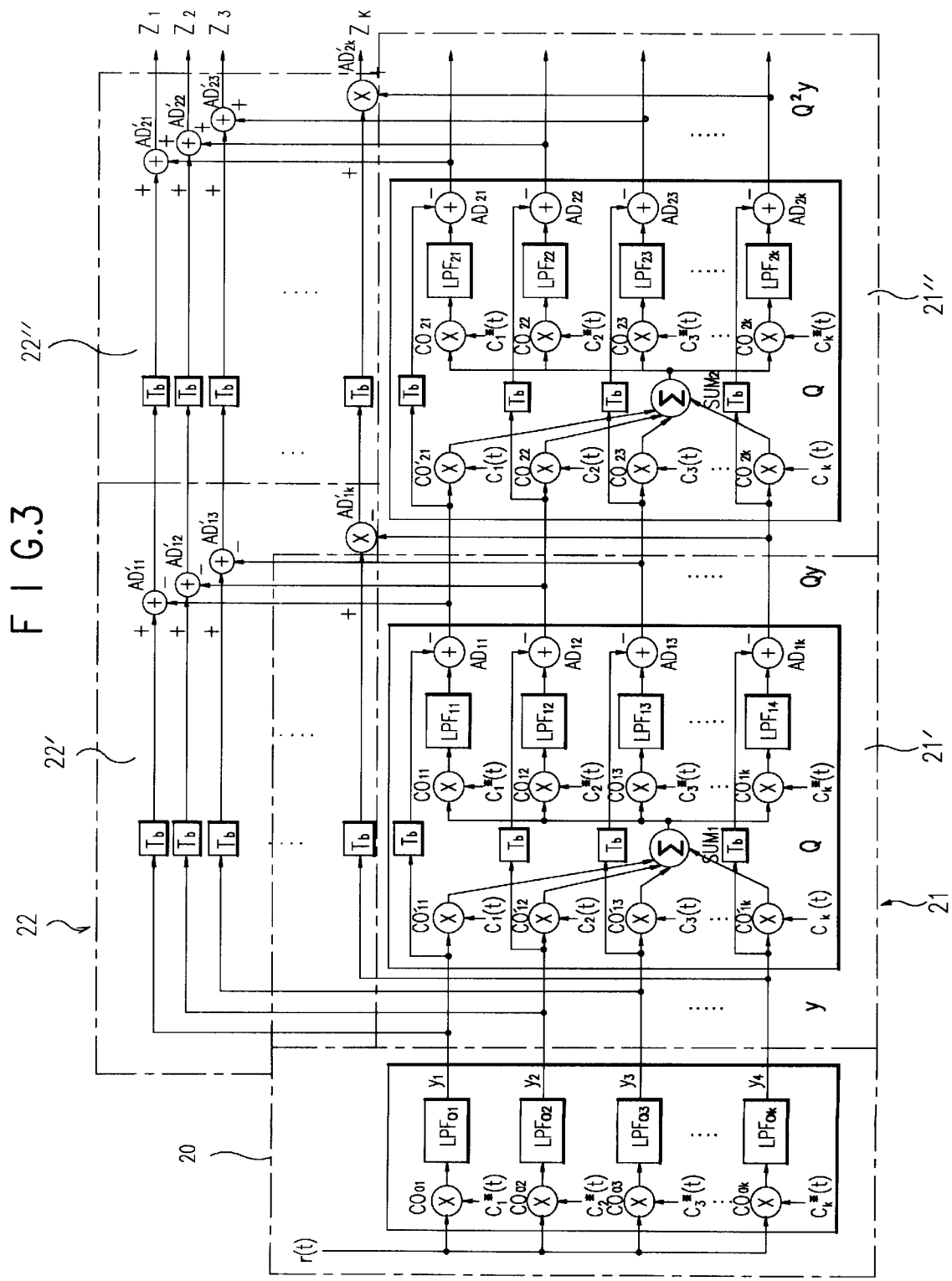
FIGS. 3 and 4 illustrate a block diagram showing a multiuser detector in a DS-CDMA system in accordance with a preferred embodiment of the present invention, schematically; and, FIGS. 5a and 5b respectively illustrate a graph showing performance of the multiuser detector of the present invention and the background art.

Reference will now be made in detail to the preferred embodiments of the present invention, examples of which are illustrated in the accompanying drawings. FIG. 3 illustrates a block diagram showing a multiuser detector in a DS-CDMA system in accordance with a preferred embodiment of the present invention, schematically.

Figure 4:
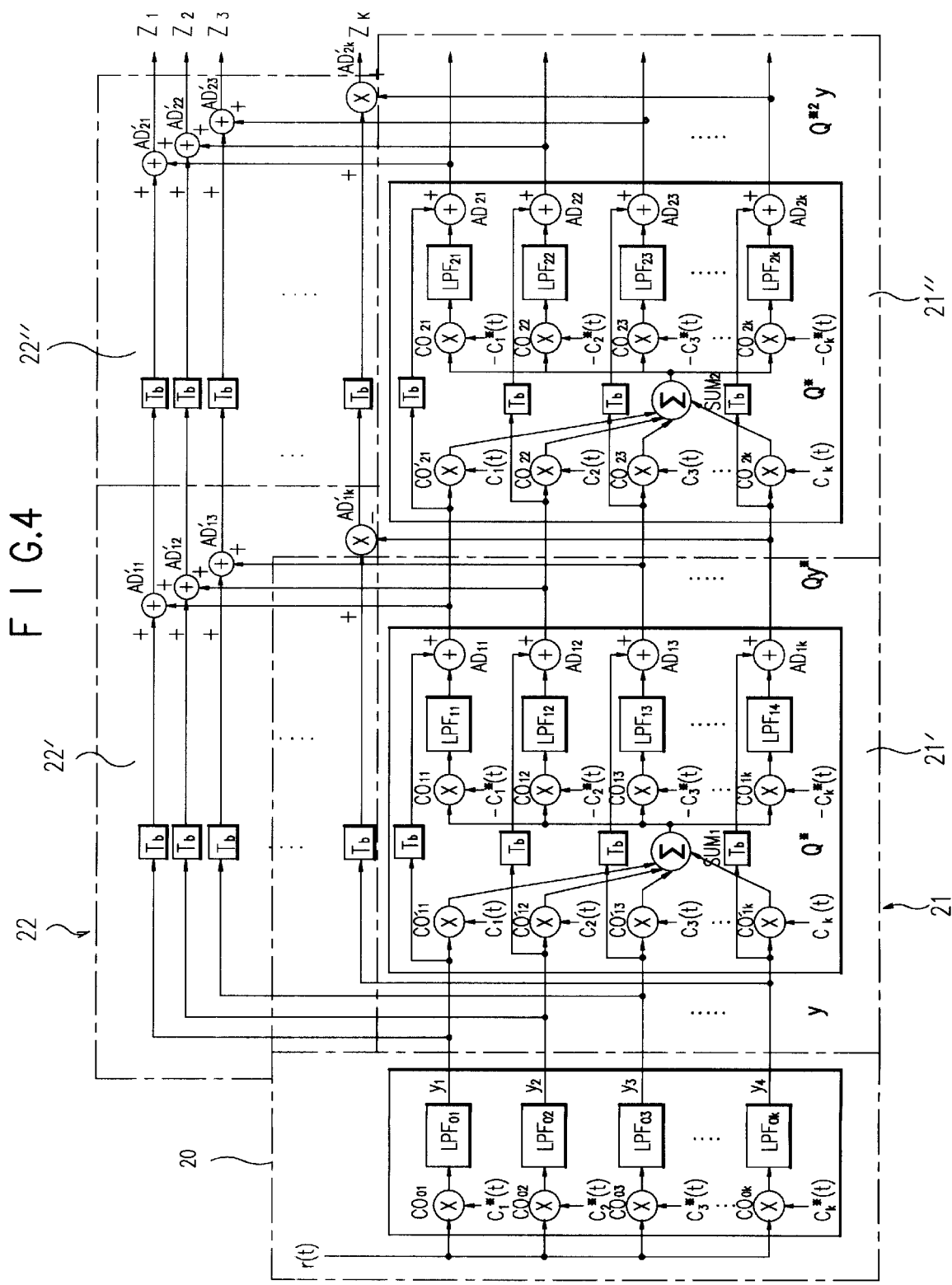

Referring to FIGS. 3 and 4, the a multiuser detector in a DS-CDMA system in accordance with a preferred embodiment of the present invention includes a matched filter block 20 for despreading received signals from multiuser with spreading codes for the multiuser to restore messages $y_1, ---, y_K$ from the multiuser, a multiple access interference signal extracting part 21 having approximate decorrelation detectors 21' and 2" connected in series by terminals thereon each for spreading the outputs y from the matched filter block 20 with the spreading codes and despreading, and filtering to extract a multiple access interference signal according to cross-correlation coefficients between the spreading codes for the multiuser, and a multiple access interference signal removing part 22 for adding outputs Qy, $Q^2y$,—from each stage of the multiple access interference signal extracting part 21 to the outputs y from the matched filter block 20, to remove the multiple access interference signal. The matched filter block 20 includes K of multipliers $CO_{01}, CO_{02}, ---, CO_{0K}$ each adapted to receive a conjugate complex $C_1^*(t) \sim C_K^*(t)$ of a spreading code for multiuser, and low pass filters $LPF_{01} \sim LPF_{0K}$, for low pass filtering outputs of the multipliers $CO_{01}, CO_{02}, ---, CO_{0K}$. The multiple access interference signal extracting block 21 has the first approximate decorrelation detector 21' and the second approximate decorrelation detector 21" connected in series, wherein the first approximate decorrelation detector 21' has a plurality of multipliers $CO'_{11}, CO'_{12}, ---, CO'_{1K}$ adapted to receive the outputs y from the matched filter block 20 and the spreading codes $C_1(t) \sim C_K(t)$, a summer $SUM_1$ for summing outputs from the multipliers $CO'_{11}, CO'_{12}, ---, CO'_{1K}$, a plurality of multipliers $CO_{11}, CO_{12}, ---, CO_{1K}$ adapted to receive conjugate complexes $C_1^*(t) \sim C_K^*(t)$ of the spreading codes, low pass filters $LPF_{11} \sim LPF_{1K}$ for low pass filtering outputs from the multipliers $CO_{11}, CO_{12}, ---, CO_{1b}$ a plurality of delays Tb~Tb for delaying restored messages y of the multiuser for one bit, and a plurality of adders $AD_{11}, ---, AD_{1K}$ for adding negative values of outputs from the plurality of delays Tb~Tb to outputs from the low pass filters $LPF_{11} \sim LPF_{1K}$, respectively. The second approximate decorrelation detector 21" has a system identical to the first approximate decorrelation detector 21', wherein multipliers $CO'_{21}, \sim CO'_{2k}$, summer $SUM_2$, multipliers $CO_{21}, \sim CO_{2k}$, low pass filters $LPF_{21} \sim LPF_{2k}$, adders $AD_{21} \sim AD_{2k}$ have correspondingly the same functions as the multipliers $CO'_{11} \sim CO'_{1K}$, the summer $SUM_1$, the multipliers $CO_{11} \sim CO_{1K}$, the low pass filters $LPF_{11} \sim LPF_{1K}$ and the adders $AD_{11} \sim AD_{1K}$ of the first decorrelation detector 21', of which explanation will be omitted. The multiple access interference signal removing part 22 includes a first removing part 22' and a second removing part 22", and the first removing part 22' includes delays Tb~Tb for respectively delaying the outputs y from the matched filter block 20 by one bit, and adders $AD'_{11} \sim AD'_{1K}$ for respectively adding negative values of the outputs Qy from the first approximate decorrelation detector 21' to the outputs from the delays Tb~Tb, and the second removing part 22" includes delays Tb~Tb for respectively delaying the outputs from the fast removing part 22' by one bit, and adders $AD'_{21} \sim AD'_{2k}$ for respectively adding outputs Qy from the second approximate decorrelation detector 21" to the outputs from the delays Tb~Tb.

Though this embodiment shows two stages of approximate decorrelation detectors connected in series, more than two approximate decorrelation detectors connected in series may be provided as required, with the multiple access interference signal removing part 22 provided with removing parts each having a system as the first removing part 22' or the second removing part 22" at a position where one of the approximate decorrelation detectors is provided, for respectively providing negative values of the outputs from the approximate decorrelation detectors and positive values of the outputs to odd numbered and even numbered adders respectively, or only one approximate decorrelation detector may be used, as necessary.

The operation of the aforementioned multiuser detector in a DS-CDMA system in accordance with one preferred embodiment of the present invention will be explained.

First, the matched filter block 20 receives a signal r(t) and has the received signal r(t) multiplied in the multipliers $CO_{01}, CO_{02}, ---, CO_{0K}$ to received conjugate complexes $C_1^*(t) \sim C_K^*(t)$ of the spreading codes of the multiuser, to despread the received signal r(t) which is then filtered through the low pass filters $LPF_{01} \sim LPF_{0K}$ to restore the multiuser messages $y=(y_1 \sim y_K)$. In this instance, the messages y contain the multiple access interference signal according to the cross-correlation coefficients between the multiuser spreading codes. In the first approximate detector 21' of the multiple access interference signal extracting part 21, the multipliers $CO'_{11}, \sim CO'_{1K}$ multiply the messages y to the spreading codes $C_1(t \sim C_K(t))$, which is then summed through the summer $SUM_1$, outputs from the summer $SUM_1$ and the conjugate complexes $C_1^*(t) \sim C_K^*(t)$ of the spreading codes are multiplied in the multipliers $CO_{11} \sim CO_{1b}$ to despread the outputs from the summer $SUM_1$, which is filtered in the low pass filters $LPF_{11} \sim LPF_{1K}$, the messages y are respectively delayed by one bit through the delays Tb~Tb to make bits synchronized, and resultants of the filtering and negative values of the bit synchronized messages y are added in the adders $AD_{11} \sim AD_{1b}$ to extract the multiple access interference signal Qy according to the cross-correlation coefficients of the multiuser spreading codes, for the first time. In this instance, the Q is a matrix having the cross-correlation coefficients between the multiuser spreading codes as entries with 0 diagonal terms.

Next, in the first removing part 22' of the multiple access interference signal removing part 22, the messages $y=(y_1 \sim y_K)$ are respectively bit synchronized to be delayed by one bit through the delays Tb~Tb, and negative values of the multiple access interference signals Qy extracted in the first approximate decorrelation detector 21 of the multiuser interference signal extracting part 21 are respectively added to the bit synchronized messages y through the adders $AD'_{11} \sim AD'_{1K}$ to obtain messages $Z'=(Z'_1 \sim Z'_K)$ having the multiple access interference signal removed therefrom for the first time. Then, in the same manner, the second approximate decorrelation detector 21" of the multiple access interference signal extracting part 21, receives outputs Qy from the first approximate decorrelation detector 21' and extracts therefrom multiple access interference signal $Q^2y$ for the second time. The message signals $Z'=(Z'_1 \sim Z'_K)$ having the multiple access interference signal removed therefrom for the first time in the first removing part 22' of the multiple access interference signal removing part 22 are bit synchronized by one bit through the delays Tb~Tb, and respectively added to the second multiple access interference signal $Q^2y$ to obtain final ouputs of $Z=(Z_1 \sim Z_K)$. That is, the outputs Z may be expressed in a matrix as shown in equation 4.

$$Z = [I - Q + Q^2]y \qquad (4)$$

Where, I denotes an identity matrix with its diagonal entrys being unity, and Q denotes a matrix with its diagonal entries being 0 and the other entries being the cross-correlation coefficients between each of the multiuser spreading codes.

In the meantime, the aforementioned inverted matrix $R^{-1}$ may be developed into a Taylor series as shown in equation (5).

$$R^{-1} = (I+Q)^{-1} = I - Q + Q^2 - Q^3 + \qquad (5)$$

Therefore, it can be known that the embodiment of the present invention as expressed by the equation (4) is an approximation of the Taylor series as expressed in equation (5) taken up to second power dependent term. Though the system in this embodiment only has two approximate decorrelation detectors blocks Q for implementing the matrix Q), the approximate decorrelation detectors may be provided as required, for respectively providing negative values for the outputs from odd numbered approximate decorrelation detectors and positive values for the outputs from even numbered approximate decorrelation detectors to corresponding adders in the removing part of the multiuser interference signal removing part 22, for implementing a multiuser detector as expressed by equation 5. And, only one approximate decorrelation detector may be used for implementing the multiuser detector, as the case demands.

A detecting method in a DS-CDMA system in accordance with the present invention will be explained.

A signal r(t) band spreaded by multiuser spreading codes each transmitted by the multiuser is multiplied to the conjugate complexes $C_1^*(t) \sim C_K^*(t)$ of the spreading codes, to despread the signal, which is then filtered to restore the multiuser messages $y = (y_1 \sim y_K)$. The restored messages y is multiplied with a spreading code $C_1(t) \sim C_K(t)$, to spread the messages y, and resultants are summed. Then, the summed value and the conjugate complexes $C_1^*(t) \sim C_K^*(t)$ of the spreading codes are multiplied, to despread the summed value, and filtered by using low pass filters. Then, negative values of the bit synchronized messages y are added to the filtered value, to extract first multiple access interference signals Qy contained in the multiuser messages. The extracted negative values −Qy of first multiple access interference signal are added to the messages y having bit synchronized by one bit, to obtain multiuser messages I−Qy having the multiple access interference signals contained in the multiuser messages removed therefrom for the first time. Next, in the same manner as above, the multiple access interference signals Qy extracted for the first time are subjected to spreading, despreading and filtering by using the multiuser spreading codes, and added to the negative values of the multiple access interference signals extracted for the first time, to obtain multiple access interference signals $Q^2y$, for the second time. The multiuser messages (I−Q)y having the multiuser interference signals removed therefrom for the first time are bit synchronized and added to the multiple access interference signals extracted for the second time, to provide final multiuser messages $Z = (I - Q + Q^2)y$.

In the embodiment of the multiuser detecting method, though the multiple access interference signals are extracted for two time in succession, negative values of the multiple access interference signals extracted for the first time are added to the multiuser messages, and positive values of the multiple access interference signals extracted for the second time are added thereto, the present invention is not limited to this, but the multiuser detecting method may be embodied such that only the negative values of the multiuser interference signals extracted for the first time are added to the multiuser messages for simplifying the system even though a quality of the signal may be somewhat degraded as the case demands or such that a plurality of the multiple access interference signal extractions are conducted in sequence, and the resultants are added, under bit synchronization, to the multiuser messages obtained by removing the multiple access interference signals in respective prior step, so that negative values of the extracted values from the odd numbered multiple access interference signals and positive values of the extracted values from the even numbers multiple access interference signals are added thereto under bit synchronization.

Figure 1:
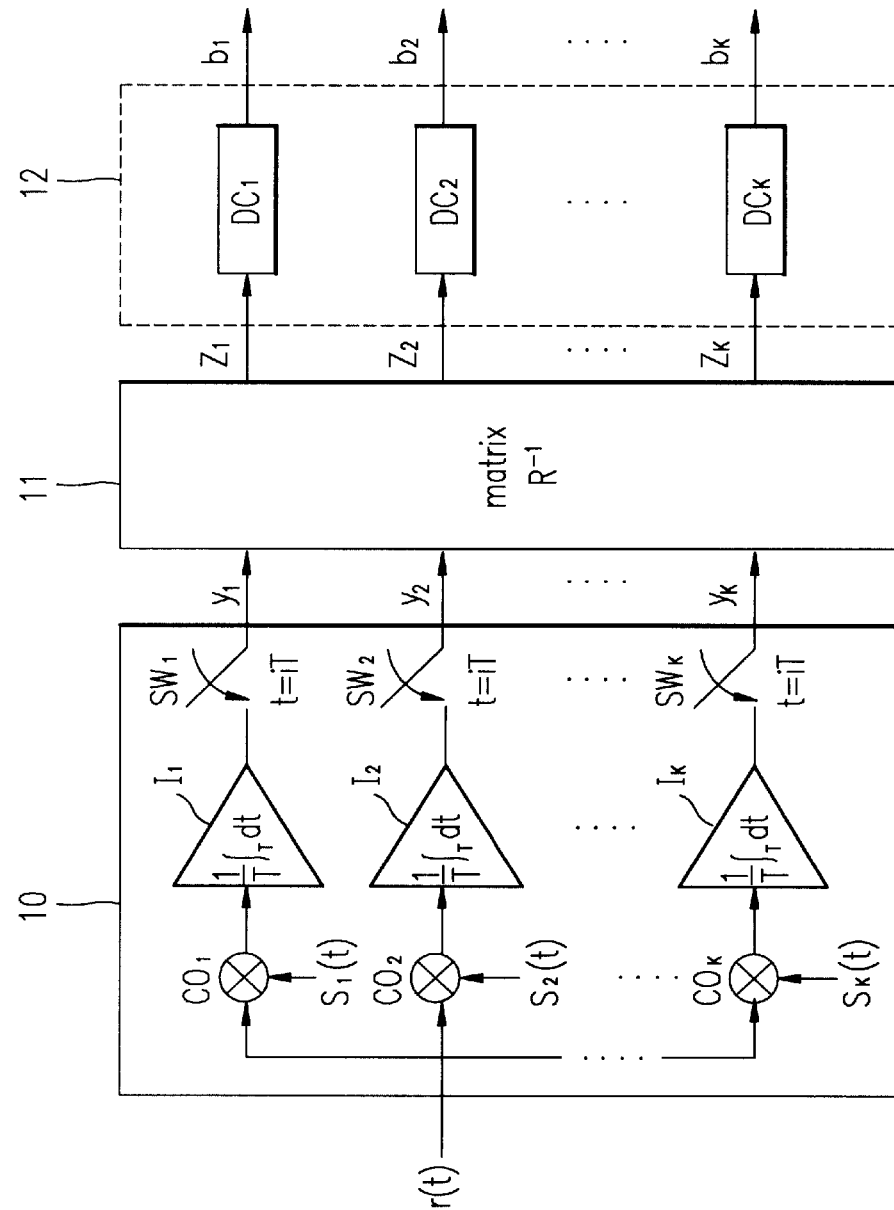
FIGS. 1 and 2 illustrate block diagrams each showing a background art multiuser detector in a DS-CDMA system, schematically.
Figure 2:
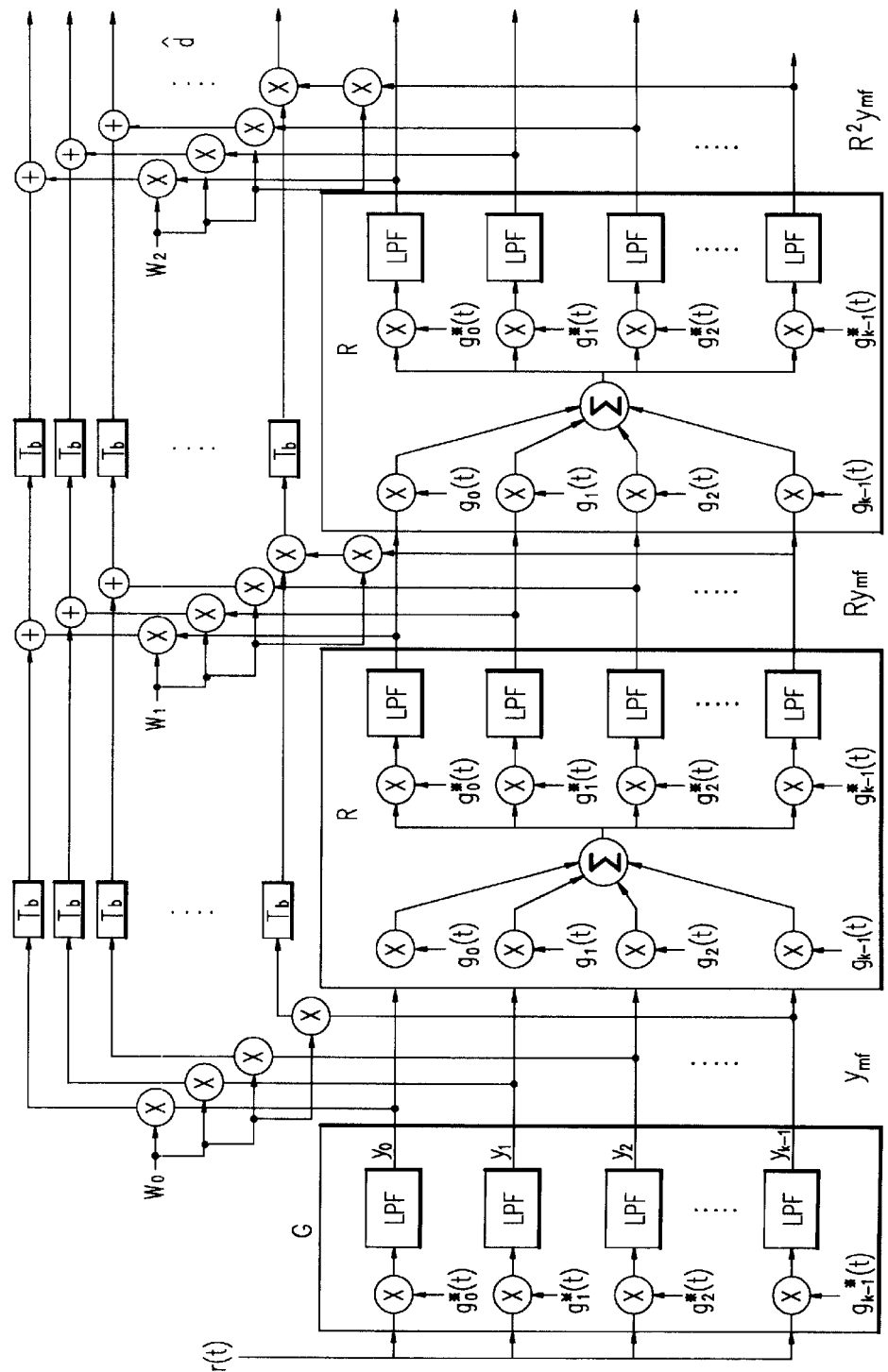
Figure 5A:
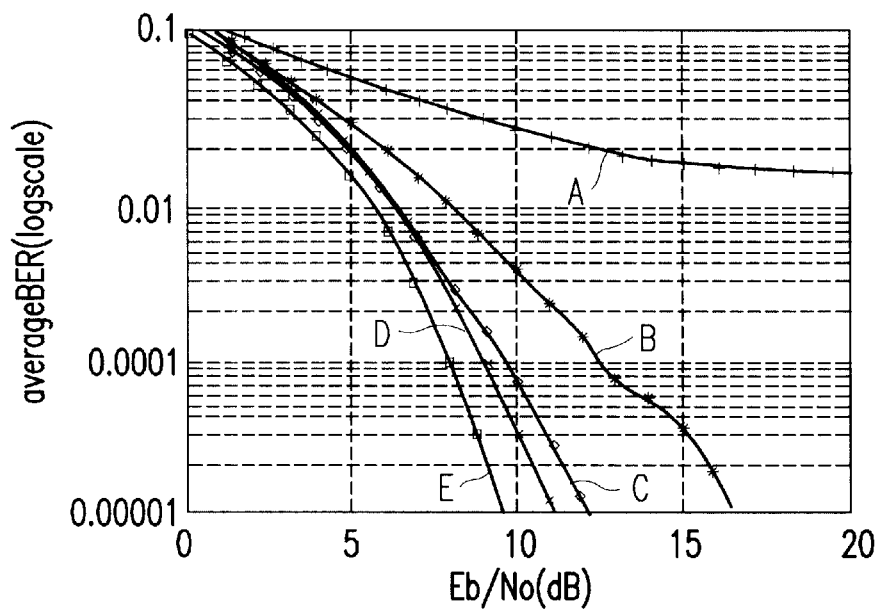
Figure 5B:
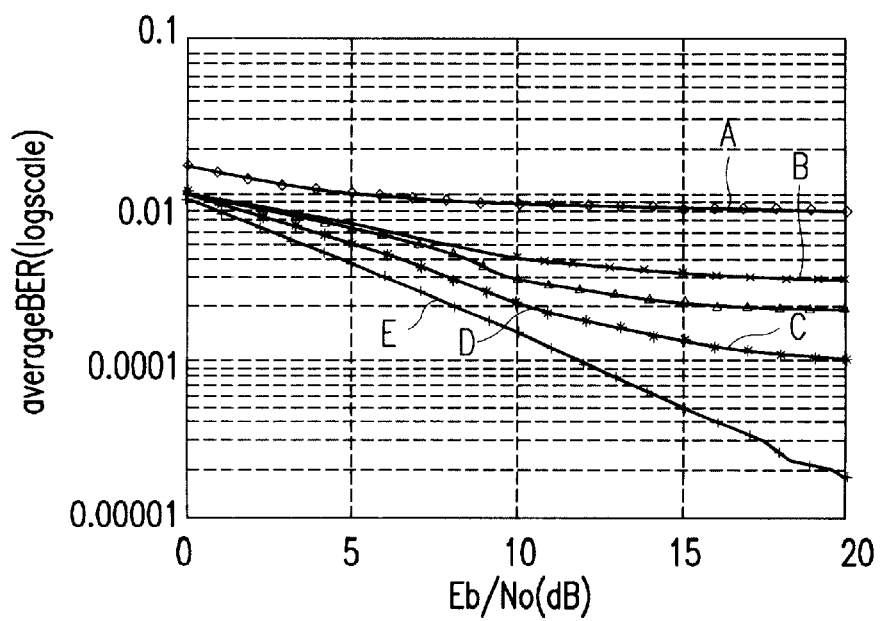

FIGS. 5a and 5b illustrate performances of detectors when a length of the spreading code is $2^{13}-1$, a processing gain is 31 and K=10. FIG. 5a illustrates results of simulations for average BER vs. Eb/No(dB) under a case of an ideal power control, and FIG. 5b illustrates results of simulations for average BER vs. Eb/No(dB) under a Rayleigh fading environment, wherein the graph A shows a case of the background art multiuser detector with the matched filter block 10 in FIG. 1 used, the graphs B, C and D are cases when 1, 2 and 3 of the approximate decorrelation detectors are used respectively, and the graph E shows a case when an imaginary detector by using impracticable inverted matrix $R^{-1}$ filter, though it is ideal. As seen from FIGS. 5a and 5b, it can be known that the multiuser detector of the present invention is excellent than the background one in the performance even when only one approximate decorrelation detector, and in the cases when one or two of them are added thereto, particularly when two of them are added, the performance is not significantly degraded compared to the detector which can implement an ideal inverted matrix $R^{-1}$ filter.

As has been explained, because the present invention does not embody the multiuser detector by using coefficients calculated on the background art least mean square error basis, allowing the system being, not only simple, but also approximated to the performance of the imaginary decorrelation multiuser detector by using the ideal inverted matrix $R^{-1}$ filter, the multiuser detector of the present invention has excellent advantages in that it can have an increased multiuser capacity and a reduced bit error rate because the multiuser signals can be reduced substantially.

It will be apparent to those skilled in the art that various modifications and variations can be made in the device and method for multiuser detection in a DS-CDMA system of the present invention without departing form the spirit or scope of the invention. Thus, it is intended that the present invention cover the modifications and variations of this invention provided they come within the scope of the appended claims and their equivalents.

What is claimed is:

1. A method for a multiuser detection in a DS-CDMA (Direct Sequence-Code Division Multiple Access) system, comprising the steps of:
   (a) receiving signals band spread by multiuser spreading codes transmitted from respective multiusers and despreading the received signals with conjugate complexes of the multiuser spreading codes, to restore each of multiuser messages y;
   (b) spreading said each of the multiuser messages y with the respective multiuser spreading codes, summing, respectively despreading with the conjugate complexes of the multiuser spreading codes, low pass filtering, and subtracting resulting filtered signals based on the multiuser messages y from the multiuser messages y under bit synchronizations to extract multiple access interference signals Qy, which are in accordance with cross-correlation coefficients between the multiuser spreading codes, contained in said each of the multiuser messages y for a first time; and, (c) adding negative values of the multiple access interference signals Qy extracted in the step (b) to the multiuser messages y under bit synchronization, for restoring each of multiuser messages $Z=(I-Q)y$ having the multiple access interference signals removed therefrom for the first time (where, Q denotes a matrix with its diagonal entries being 0 and the other entries being the cross-correlation coefficients between each of the multiuser spreading codes and I denotes an identity matrix with its diagonal entries being unity, $Z=[Z_1, ---, Z_K]$ and $y=[y_1, ---, y_K]$).

2. A method as claimed in claim 1, further comprising the steps of:

(d) spreading the multiple access interference signals Qy extracted in the step (b) for the first time of the spreading codes, summing, despreading with the conjugate complexes of the spreading codes, low pass filtering, and adding resulting filtered signals based on the multiple access interference signals Qy to negative values of the multiple access interference signals Qy extracted in the step (b) under bit synchronization, for extracting multiple access interference signals $Q^2y$ for a second time; and, (e) adding the multiple access interference signals $Q^2y$ to the restored messages $Z=(I-Q)y$ in the step (c) under bit synchronization, for restoring multiuser messages $Z=[I-Q+Q^2]y$.

3. A method as claimed in claim 2, further comprising the steps of:

(f) respectively conducting spreading and despreading of new multiple access interference signals extracted in a prior step with the spreading codes in the same manner as the step (d), for extracting multiple access interference signals $Q^3y$, $Q^4y$, ---, as many times as desired; and, (g) adding the multiple access interference signals extracted in the step (f) to the multiuser messages restored in a prior step under bit synchronization, wherein negative values when an order of the Q is an odd number and positive values when the order is an even number are added, for extracting new multiuser messages.

4. A method for a multiuser detection in a DS-CDMA (Direct Sequence-Code Division Multiple Access) system, comprising the steps of:

(a) receiving signals band spread by multiuser spreading codes transmitted from respective multiusers and despreading the received signals with conjugate complexes of the multiuser spreading codes, to restore each of multiuser messages y;

(b) spreading said each of the multiuser messages y with the respective multiuser spreading codes, summing, respectively despreading with negative (−) conjugate complexes of the multiuser spreading codes, low pass filtering, and adding resulting filtered signals based on the multiuser messages y to the multiuser messages y under bit synchronizations to extract multiple access interference signals $Q^*y$, which are in accordance with cross-correlation coefficients between the multiuser spreading codes, contained in said each of the multiuser messages y for a first time; and, (c) adding negative values of the multiple access interference signals $Q^*y$ extracted in the step (b) to the multiuser messages y under bit synchronization, for restoring each of multiuser messages $Z=(I+Q^*)y$ having the multiple access interference signals removed therefrom for the first time (where, $Q^*$ denotes a matrix with its diagonal entries being 0 and the other entries being negative(−) value of the cross-correlation coefficients between each of the multiuser spreading codes and I denotes an identity matrix with its diagonal entries being unity, $Z=[Z_1, ---, Z_K]$ and $y=[y_1, ---, y_K]$).

5. A method as claimed in claim 4, further comprising the steps of:

(d) spreading the multiple access interference signals $Q^*y$ extracted in the step (b) for the first time of the spreading codes, summing, despreading with the negative(−) conjugate complexes of the spreading codes, low pass filtering, and adding resulting filtered signals based on the multiple interference access signals Qy to negative values of the multiple access interference signals $Q^*y$ extracted in the step (b) under bit synchronization, for extracting multiple access interference signals $Q^{*2}y$ for a second time; and, (e) adding the multiple access interference signals $Q^{*2}y$ to the restored messages $Z=(I+Q^*)y$ in the step (c) under bit synchronization, for restoring multiuser messages $Z=[I+Q^*+Q^{*2}]y$.

6. A method as claimed in claim 5, further comprising the steps of:

(f) respectively conducting spreading and despreading of new multiple access interference signals extracted in a prior step with the spreading codes in the same manner as the step (d), for extracting multiple access interference signals $Q^{*3}y$, $Q^{*4}y$, ---, as many times as desired; and, (g) adding the multiple access interference signals extracted in the step (f) to the multiuser messages restored in a prior step under bit synchronization.

7. A device for a multiuser detection in a DS-CDMA system, comprising:

a matched filter block for despreading signals received from multiusers using corresponding multiuser spreading codes to restore messages of the multiusers;

a multiple access interference signal extracting part coupled to the matched filter block having at least one approximate decorrelation detectors connected in series, wherein each of the at least one approximate decorrelation detectors receives input signals for spreading, despreading and filtering by using the multiuser spreading codes to output intermediate resultant filtered signals, and wherein said each of the approximate decorrelation detectors combines the intermediate resultant filtered signals with the input signals under bit synchronization to extract multiple access interference signals according to cross-correlation coefficients between the multiuser spreading codes; and, a multiple access interference signal removing part for adding or subtracting outputs at said each approximate decorrelation detectors of the multiple access interference signal extracting part to or from respective outputs from the matched filter block to remove the multiple access interference signals.

8. A device as claimed in claim 7, wherein a first one of the approximate decorrelation detectors, comprises:

first multipliers for respectively multiplying outputs from the matched filter block and the multiuser spreading codes, a summer for summing outputs from the first multipliers, second multipliers for respectively multiplying outputs from the summer and conjugate complexes of the multiuser spreading codes, low pass filters for respectively filtering outputs from the second multipliers, delays for respectively delaying the outputs from the matched filter block by one bit, and adders for respectively adding negative values of outputs from the delays to outputs from the low pass filters.

9. A device as claimed in claim 8, wherein remaining ones of the approximate decorrelation detectors each comprises:

the first multipliers for respectively multiplying outputs from a preceding approximate decorrelation detector and the multiuser spreading codes;

the summer for summing outputs from the first multipliers;

the second multipliers for respectively multiplying the outputs from the summer and the conjugate complexes of the multiuser spreading codes;

the low pass filters for respectively filtering the outputs from the second multipliers;

the delays for respectively delaying the outputs from the preceding approximate decorrelation detector by one bit; and the adders for respectively adding the negative values of outputs from the delays to outputs from the low pass filters.

10. A device as claimed in claim 7, wherein said each of the approximate decorrelation detectors adds or subtracts the input signals under bit synchronization with the intermediate resultant filtered signals.

* * * * *